United States Patent [19]

von Krusenstierna

[11] 4,052,541
[45] Oct. 4, 1977

[54] ELECTRIC ACCUMULATOR CELL WITH AT LEAST ONE DISSOLUBLE ELECTRODE

[75] Inventor: Otto von Krusenstierna, Taby, Sweden

[73] Assignee: Aktiebolaget Tudor, Sundbyberg, Sweden

[21] Appl. No.: 636,656

[22] Filed: Dec. 1, 1975

Related U.S. Application Data

[63] Continuation-in-part of Ser. No. 422,591, Dec. 6, 1973, Pat. No. 3,923,550, which is a continuation of Ser. No. 186,219, Oct. 4, 1971, abandoned.

[30] Foreign Application Priority Data

July 15, 1975 Sweden .................................. 7508111

[51] Int. Cl.² ................................................ H01M 4/70
[52] U.S. Cl. ...................................... 429/233; 429/241
[58] Field of Search ............... 136/49, 46, 125, 120 R; 429/233, 234, 241

[56] References Cited

U.S. PATENT DOCUMENTS

| | | | |
|---|---|---|---|
| 940,288 | 11/1909 | Tate | 136/46 |
| 3,023,262 | 2/1962 | Emmerling et al. | 136/120 R |
| 3,069,486 | 12/1962 | Solomon et al. | 136/125 |
| 3,180,761 | 4/1965 | Horn et al. | 136/120 R |
| 3,186,871 | 6/1965 | Donohue | 136/120 R |

*Primary Examiner*—John H. Mack
*Assistant Examiner*—H. A. Feeley
*Attorney, Agent, or Firm*—Burns, Doane, Swecker & Mathis

[57] ABSTRACT

An improvement in electric accumulator cells having a dissoluble electrode (e.g., a zinc electrode) and a counter-electrode (e.g., nickel electrode) is disclosed. The dissoluble electrode is formed by a central layer having outer layers disposed on either plane side thereof. The outer layers are generally smaller in planar size than the central layer and preferably all of the layers are porous, perforated or netlike. The multi-layer electrode has particular utility in a cell in which the dissoluble electrode and/or separator disposed between the dissoluble electrode and counter-electrode are vibrated in the plane of the electrode. Dendrite growth and shaping of the deposited active material are substantially minimized and improved cell life is obtained.

14 Claims, 4 Drawing Figures

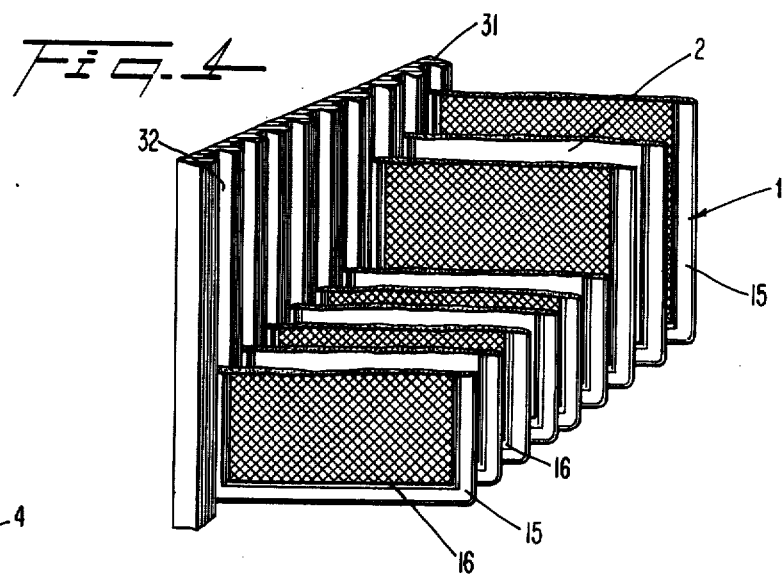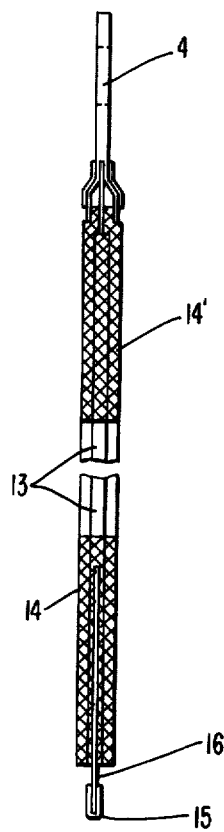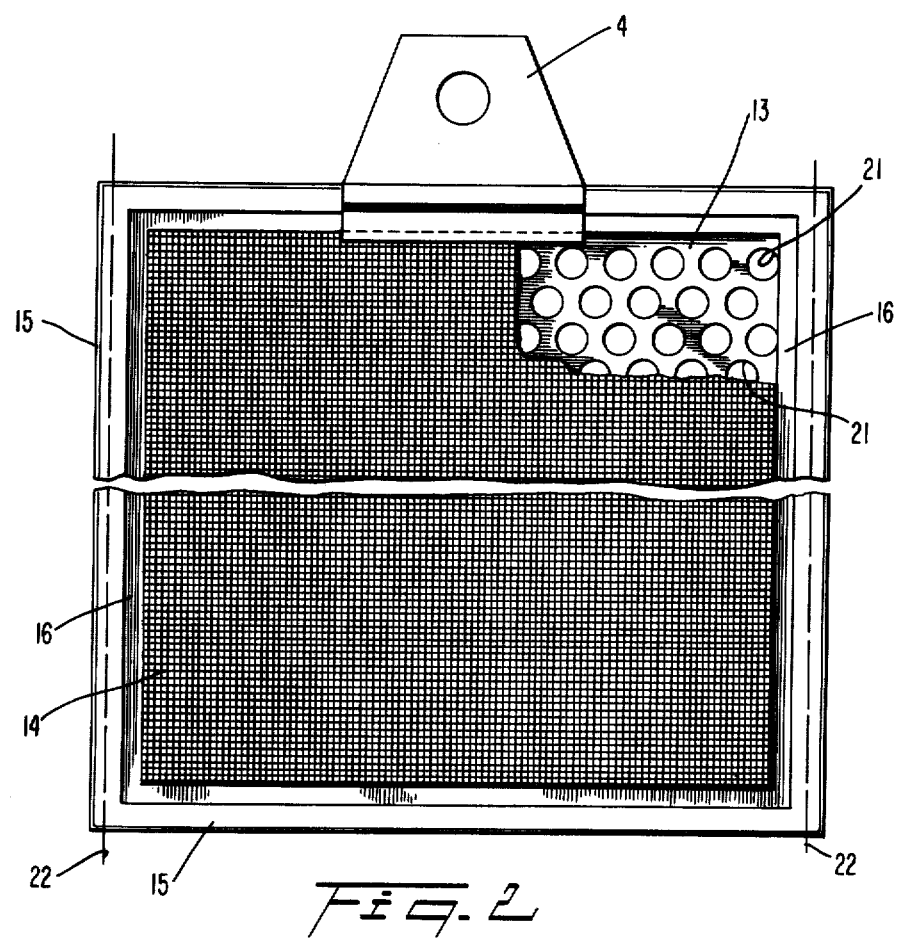

ELECTRIC ACCUMULATOR CELL WITH AT LEAST ONE DISSOLUBLE ELECTRODE

This application is a continuation-in-part of my pending application Ser. No. 422,591, filed Dec. 6, 1973, now U.S. Pat. No. 3,923,550 which application in turn is a continuation of prior application Ser. No. 186,219, filed Oct. 4, 1971, and now abandoned.

The present invention concerns an electric accumulator cell with at least one dissoluble electrode, containing a metal which on discharge forms a soluble chemical compound. The cellfurther contains the remaining components necessary for the functioning of aforesaid cell, i.e., counter electrode, electrolyte and separators (or spacers), etc. The invention concerns also such cells in which the chemical compound formed during the discharge is soluble by itself in the electrolyte used, but because of special circumstances is immediately deposited as a solid compound. Such circumstances may, for example, be an over-saturated electrolyte or the addition of further material with which the metal in question forms in the electrolyte insoluble compounds. The invention is applicable, e.g., for accumulator cells containing zinc electrodes. These zinc electrodes form products soluble in the electrolyte when discharged in an alkaline electrolyte. However, the electrolyte might be oversaturated and the zinc dissolved from the electrode during discharge, will then be deposited from the electrolyte as solid zinc oxide. The chemical reactions during the discharge of different electrodes in different electrolytes are not fully known. In the example above and in the following, certain intermediate products which might exist during the chemical reactions for a short time are not taken into consideration.

An important problem with cells with soluble electrodes is obtaining a satisfactory life for the cell. Cell life mainly depends upon the conditions pertaining to the charging of discharged electrodes. During charging, the active material of the dissoluble electrodes shows a tendency to form dendrites, growing out from the electrodes in the direction of the counter electrodes, which dendrites may thus easily cause short circuits. Furthermore, certain effects at the edges, so-called shaping, may occur when the active material is redeposited. Shaping causes the layer of active material at the outer edges and lower portions of the electrodes to show a tendency to increase more in thickness than on the remainder of the electrode surface.

Different methods have been tried to solve these problems, which have resulted in an increased life of the cells, yet no fully satisfactory values were obtained. The measures taken have, in many cases, led to more complicated and thus more expensive cell constructions and were so dependent on, for example, electrolyte concentrations and other conditions within the cells, that the utility of the cells became more circumscribed and the cost of the cells has increased.

The present invention is also intended to solve those problems and to produce a cell with a satisfactory life by such methods of construction, which do not circumscribe the utility of the cells, and make these cells more appreciated from an economic point of view than previously known cell constructions.

The construction of the dissoluble electrode is of great importance in such a cell. Quite unexpectedly, it has been proven that by building the electrodes according to the invention from a body consisting of several layers, an electrode of exceptionally good reproduction qualities can be obtained, while at the same time shaping tendencies were substantially eliminated. By combining such a cell construction with previously known methods to avoid the formation of dendrites, a cell was obtained with particularly good life expectancy.

It was known previously to build dissoluble electrodes on a body of another material than the electrochemically active material. The use of such bodies which are permeable to the electrolyte and have an enlarged active surface is also previously known. The permeability to the electrolyte is obtained either by using perforated plates or by putting together the body from a fibrous material, such as for example a net of metal threads. To obtain a larger active surface of the body it has, for example, been proposed when the body consisted of a sheet, to press or emboss it to obtain a number of elevations and depressions. Another method to obtain an uneven surface is to use a sheet of varying thickness at different points of its surface. If the body is formed from fibers, these fibers can either be oriented in a pattern as, for example, in a woven net or unoriented as in a mat of the non woven type. The body of the last mentioned type can be prefabricated, more thick than finally required, whereafter the bodies are mechanically compressed. Thus the mechanical strength of the body is increased while a large active surface is maintained.

The most used method to avoid the harmful effects of dendrite formation is to surround the dissolving electrode by a separator which is so dense that the dendrites are unable to penetrate through the separator. The use of such dense separators is naturally accompanied by a limitation of electrochemical properties of the cell and thus of its utility. It has been shown that the life of such separators is insufficient for the demands put on the life of the cell.

Another method to limit the growth of dendrite is to supply the cell with a scraper or similar device, which moves along the surface of the electrode and scrapes away the protruding dendrites. Instead of scrapers, rollers may be used and they can be made in such a way that protruding dendrites are not scraped away from the electrodes, but only pressed back into the electrode again whereby they can continue to work as active material. It is even possible to use non-moving scrapers or other mechanical devices against moving electrodes. However, not even by these means it was possible to fulfill the demands put on the cells. Finally it has been proposed to vibrate the dissoluble electrodes and/or the separators or spacers. By the turbulance which thus occurs in the electrolyte, nearest to the electrode surface, an effect was achieved which inhibits the formation of dendrites.

A cell according to the invention has a dissoluble electrode, which is built upon a body which is insoluble in the electrolyte, mainly consisting of inert material, comprising at least one centrally located conducting layer on each side of which there is at least one more layer. Preferentially all these layers are perforated or porous in some way. By inert is meant that the body does not consist of a material participating in the electrochemical reactions of the cell. The central part may suitably consist of a perforated metal sheet or a fabric of metal threads. It may even consist of a non conducting material with a conducting outer layer e.g., plastic with a metal coating. The present invention requires not only the central body but also at least one more layer on each side of the central body, which shall be a separate layer not directly connected with the entire surface of the central layer. The outer layer may be formed of the same or different material than the central layer. The outer layer preferably is formed of a net of metal or of metal coated plastic but may even be formed from a plastic netting without further coating, which however, presupposes that the active material of the electrode has sufficient electrical conductivity by itself. The outer layers are suitably connected to each other by welding, brazing or other methods with the connections made at points and going through the openings in the central layer. Direct mechanical connection between the outer layers and the central layer should be avoided or at least be restricted to a number of points at only one edge (mainly because it becomes difficult to obtain fully plane bodies during their production).

It has been shown with cells according to the invention that the shaping effect will be eliminated in a surprisingly simple fashion when the outer layer has a slightly lesser extension along the plane surface of the central layer and thus leaves the edges of the central layer bare. Furthermore, a part of the outer bare edges may be covered by an insulating material to make the conducting surface of the dissoluble electrode somewhat smaller than that of the counter electrode. By "surface" is understood the geometrically projected dimension regardless of the size of the electrochemically active surface, which as previously mentioned may be influenced by corrugating, perforating or by other means. The bare edge of the central layer should be at least so wide that inside the insulating material around the edge, at least a distance double the thickness of the outer layer is left bare.

It has been shown that very suitable working conditions are obtained for the cell, if in a cell according to the invention the dissoluble electrode or the surrounding separators of spacers are so installed that they vibrate in a direction parallel to the plane surface of the electrode. Vibration of the zinc anode and/or separator part can be performed in accordance with the teachings as set forth in parent application Ser. No. 422,591 now U.S. Pat. No. 3,923,550, the teaching of which are herein incorporated by reference. As disclosed therein, the zinc anode and/or separator is vibrated in the direction of the plane of the anode or separator at a frequency and amplitude during the charging process sufficient to inhibit dendrite growth on the zinc anode. The vibrating part is mounted so that all portions thereof move substantially the same distance during each cycle of vibration and all portions of the vibrating part move in a reciprocating manner to have at the same moment the same rectilinear movement during all portions of the vibration cycle. The vibrating part may be vibrated at a frequency of from about 0.1 to 500 Hz and an amplitude sufficient to inhibit dendrite growth amplitude generally will be in the range of from about 1 to about 10 mm. or more. As the frequency of the vibration may be relatively high, the vibrating components may be placed in vertical guiding tracks. Suitably, all the electrodes are placed in such guiding tracks. Preferably, the insulating material on the edge of the central layer extends outside the guiding tracks, so that the surface of the dissoluble electrode remains smaller than that of the counter electrode. Under these conditions, very good reproduction qualities are obtained for the charging and discharging cycles and a long life of the cells is also obtained. This is especially true if the body is dimensioned in such a way that the active material of the dissoluble electrode does not fully fill up the holes in the outer layer, when the cell is fully charged.

The invention shall hereinafter by more closely described with reference to the accompanying drawings. At the same time the favourable effects which unexpectedly have been attained by the invention will be explained to certain extent. Furthermore, a preferred embodiment of the invention, which is utilized in connection with zinc electrodes will be described as it is expected that the invention has special utility in cells with such electrodes.

FIG. 2 shows a dissoluble electrode to be used in such a cell and

FIG. 3 shows a cross section of such an electrode.

FIG. 4 is a partial view of electrodes in a cell in accordance with the invention and a part of a plate with guiding tracks.

Figure 1:
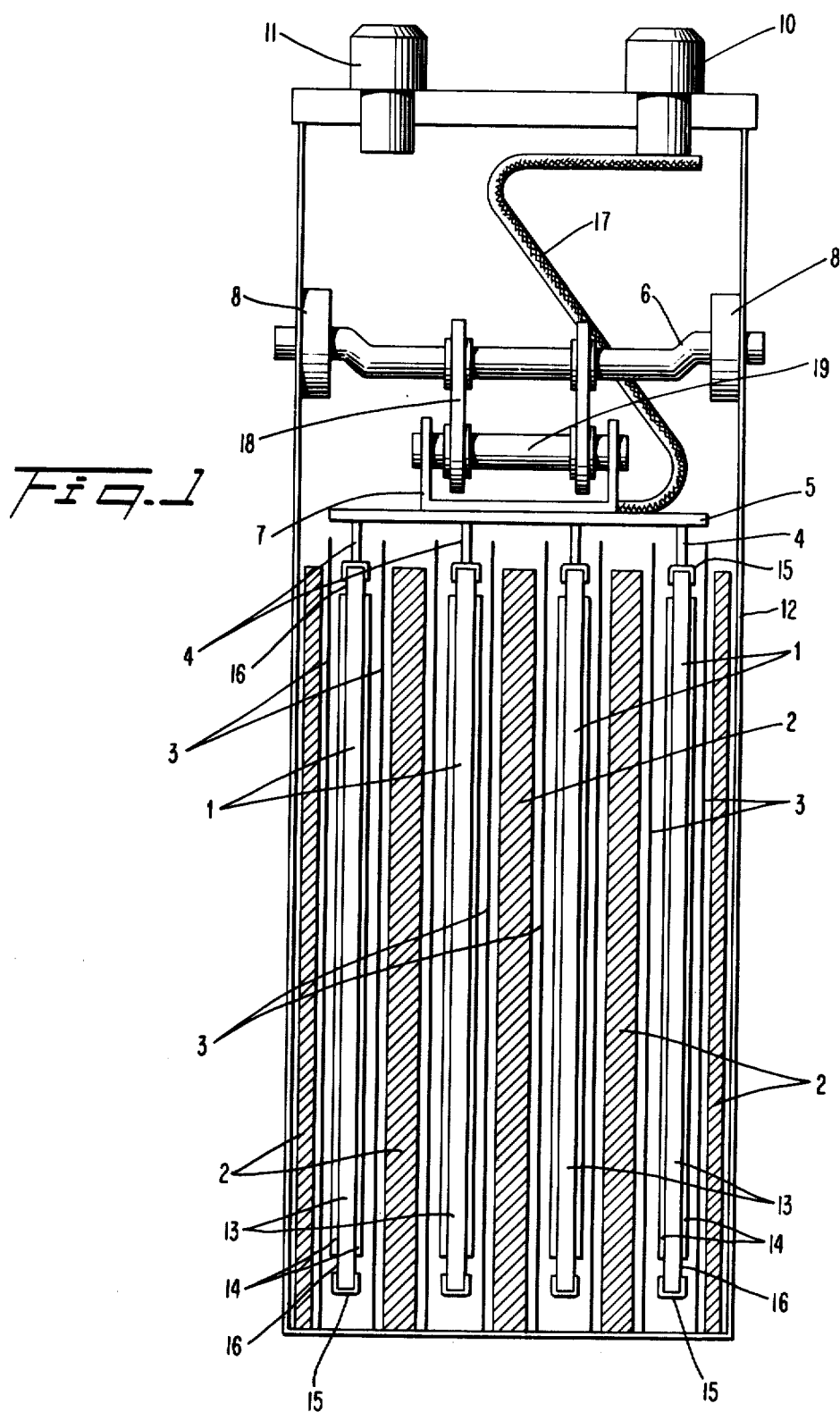
FIG. 1 shows a cross section of a cell in accordance with the invention.

In FIG. 1, a cross section of the cell at right angle to the electrodes is shown. The cell contains a number of dissoluble electrodes 1 and counter electrodes 2. Between these are situated the separators or spacers 3. The dissoluble electrodes are connected by connecting devices 4 to a common bridge 5. The dissoluble electrodes are arranged to be vibrated by a shaft 6, which is journaled between bearings 8 in the cell wall 12. The shaft is eccentrically formed and the vibratory movement is imparted by shaft 6 by suitable means outside the cell (not shown) and is imparted to electrodes through the yoke 7 and suspension and connecting devices 18 and 19. The shaft 6 is electrically insulated from the electrodes, e.g., by using connecting devices made of an insulating material. Through a flexible cord 17 the electrodes are connected to a pole post 11 on the outside. The electrodes 2 may similarly be connected to post 11 by conventional means, not shown.

The electrode shown in FIGS. 2 and 3 has a body built upon a central layer 13 which may consist of a plate with perforations 21. On each side of central layer 13 is disposed an outer layer 14 and 14' which may also consist of a porous or perforated net. These two nets 14 and 14' may be made from metal or plastic or metal coated plastic and are attached to each other by welding or cementing. The attachments are made at points through the perforations 21 of the sheet 13. In that manner, the three layers 13, 14 and 14' of the electrode body act together as one unit without a direct mechanical connection between the outer layers 14 and 14' and the central layer 13. The central layer 13 is provided with an electrically insulating material 15, which may be a U-shaped profile from a suitable plastic material or a layer of insulating lacquer around the outer edges. The size of the outer layers 14 and 14' are so much smaller than that of the central layer 13 that a bare edge 16 is formed on the sheet. The width of the bare edge 16 should be at least double that of the thickness of the outer layer 14 or 14'.

FIG. 4 shows a number of dissoluble electrodes 1a and counter electrodes 2 of which one vertical side is placed in a guiding track 32 in a disc 31. For a better lucidity only parts of the electrodes are shown. A complete cell has two discs with guiding tracks one on each side of the group of electrodes. The guiding tracks 32 may even be an integral part of the cell wall. From the Figure it can be seen that the insulating layer at the outer edge of the dissoluble electrode is covering so much of the electrode that this layer covers a small part of the electrode outside the guiding track. Thereby it is achieved that the dissoluble electrode has a smaller and less wide electrochemically active surface than the counter electrode. As known in the art, this may also be achieved by a special configuration of the disc.

The invention is additionally illustrated in connection with the following Examples which are to be considered as illustrative of the present invention. It should be understood, however, that the invention is not limited to the specific details of the Examples.

EXAMPLE 1

An electrode according to the invention was produced starting from a perforated iron sheet 13. The sheet was 0.5 mm thick, with a length of 200 mm and width of 140 mm. The sheet was perforated with circular holes 21, diameter about 6 mm, covering about 50% of the surface. On each side of the plate was disposed a net made of nickel plated iron, thickness of threads 0.5 mm, with the threads being 2 mm apart from each other. The nets 14 and 14' were 185 mm long and 125 wide and were placed centrally on each side of the iron sheet. Thereby a bare edge of 7.5 mm width was obtained at the circumference of the sheet. The nets were attached to each other by pressure welding them together through some of the perforations 21. The number of welding points was 20. Having attached connecting device 4 to the body, the outer edges of the sheet were insulated to a width of 5 mm on both sides applying an insulating lacquer 15. The meshes of the nets were 50% filled by zinc oxide conventionally used for zinc electrodes. Thereafter the electrodes are together with the counter electrodes placed in the container. The counter electrodes are nickel electrodes of the conventional type. Between the electrodes, separators are interfoliated and along the length of the guiding tracks are adjusted in such a way that they cover the outer edges of the electrodes to the dashed line 22 as shown in FIG. 2. The electrolyte in the cell was a conventional solution of potassium hydroxide in water with the usual additives.

EXAMPLE 2

The electrodes were produced as described above in Example 1, but no active material was applied. The body was placed in a cell container together with counterelectrodes and arranged for vibrations at a frequency of 50 Hz and an amplitude of 4 mm. The electrolyte in the cell was 6 molar potassium hydroxide, containing 100 g zinc oxide per liter. The thus obtained cell was charged with a 15 A current and a deposition of zinc was observed on the electrode body. In the beginning of charging, a zinc deposit was formed only on the sheet 13 inside the meshes of the nets 14 and 14'. Some deposition occured even at the bare edges 16 outside the nets. On the nets 14 and 14' a certain amount of hydrogen gassing was observed, but no deposition of zinc. After about 15 minutes of charging a deposition of zinc also occured on the nets 14 and 14'. This deposition was, however, very thin at the outside of the netting and absolutely free of dendrites. Also along the edges 16 of central layer 13 further deposition of zinc occured, through its amount was not larger than the deposition on the nets 14 and 14' and no protruding dendrites were formed on the edge 16.

EXAMPLE 3

A cell was built as described above in Example 2, but having 4 dissoluble electrodes and nickel oxide counter electrodes of the conventional type. The counter electrodes were dimensioned in such a way that the active material was deposited on the soluble electrodes in such an amount that the space within the meshes of the nets 14 and 14' was filled to 50% with zinc when obtaining the corresponding capacity. Such a cell was undergoing cycling, i.e., repeated charges and discharges, according to a predetermined scheme. With each such cycle, there occurs a full or part dissolution of the newly formed active layer of the dissoluble electrode. After 800 cycles, cells made according to the invention showed still mainly unchanged properties.

As shown by aforementioned Examples, the cells prepared in accordance with the invention had a surprisingly improved life. That is caused by the fact that the formation of dendrites and so called shaping at the edges of the electrodes has been avoided.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed:

1. In an electric accumulator cell including at least one electrode formed of an inert conducting material insoluble in said electrolyte and an active metal which on discharge formed a chemical compound soluble in the electrolyte, the improvement which comprises forming said electrode of a central conducting layer having an outer layer disposed on both planar sides thereof, the planar sides of the outer layers being smaller than the planar sides of the central layer so that the central layer has a bare portion about its periphery, at least part of the bare portion being covered with an electrically insulating material, the width of the bare portion between the insulating material and the outer layer being at least twice the thickness of the outer layer, each layer being composed of an inert conducting material insoluble in said electrolyte.

2. The cellof claim 1 wherein all of said layers are porous.

3. The cells of claim 1 wherein said central conducting layer is a perforated sheet or net having disposed on both planar sides thereof an outer layer which is a porous net.

4. The cell of claim 3 wherein said central conducting layer comprises iron.

5. The cell of claim 3 wherein said central conducting layer comprises nickel-plated iron.

6. The cells of claim 3 wherein said central conducting layer comprises metal-coated plastic.

7. The cell of claim 3 wherein said outer layers are comprised of metal or plastics.

8. The cell of claim 7 wherein said outer layers are nickel-plated.

9. The cell of claim 3 wherein the characterized outer layers are connected to each other at certain points passing through perforations in the central layer.

10. The cell of claim 9 wherein the said outer layers are not directly connected to the central layer.

11. The cells of claim 1 wherein the cell further includes a separator disposed near the dissoluble electrode and the electrode and/or separator is arranged to vibrate in a direction parallel to the plane surface of the electrode.

12. The cell of claim 11 wherein at least one of the vibrating components is contained in guiding tracks.

13. The cell of claim 12 wherein all electrodes are contained in parallel guiding tracks, the outer edges of the electrodes being covered by insulating material with the insulating material protruding outside the guiding track.

14. The cell of claim 2 wherein dissoluble electrode in which the active metal contained therein does not completely fill the apertures of the outer layer when the cell is fully charged.

* * * * *